Figure 1:
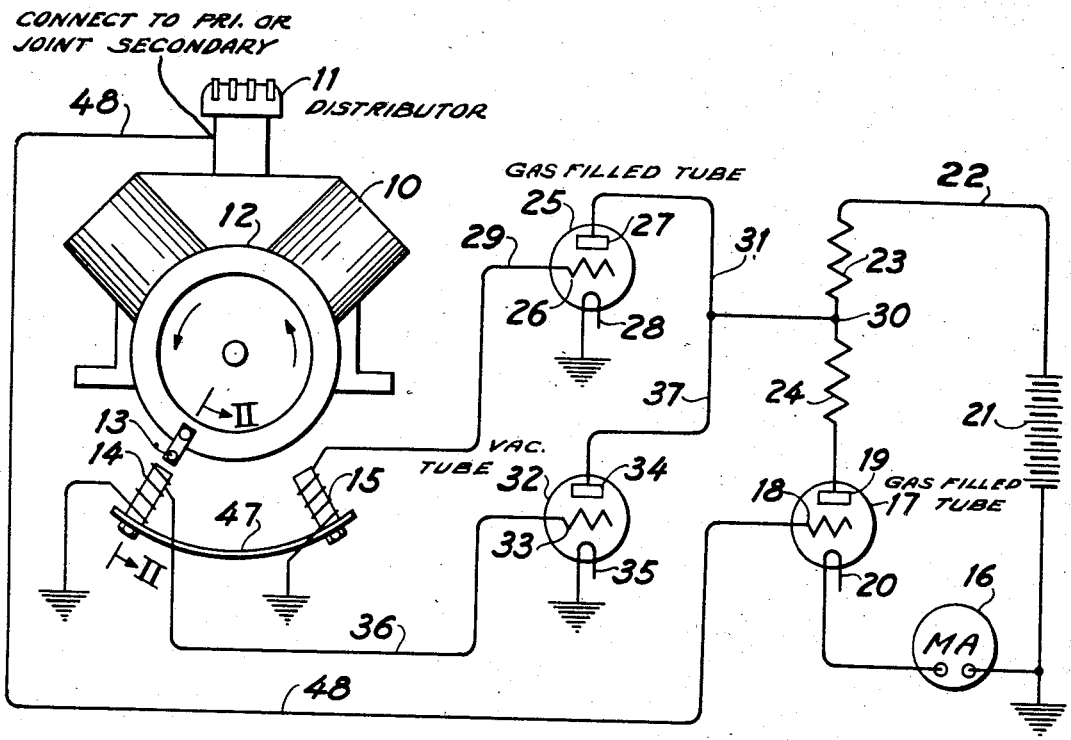

Nov. 25, 1941.　　　　K. R. ELDREDGE　　　　2,263,859

SPARK ADVANCE INDICATOR

Filed March 23, 1940

INVENTOR
Kenneth R. Eldredge
By *[signature]*
ATTORNEY

Patented Nov. 25, 1941

2,263,859

UNITED STATES PATENT OFFICE 2,263,859

SPARK ADVANCE INDICATOR

Kenneth R. Eldredge, Berkeley, Calif., assignor to Standard Oil Company of California, San Francisco, Calif., a corporation of Delaware Application March 23, 1940, Serial No. 325,584

6 Claims. (Cl. 177—311)

This invention relates to a method for measuring and indicating the ratio of intervals between cyclically repeated sets of impulses, and particularly refers to a spark advance indicator for a spark ignition internal combustion engine, said indicator adapted to measure the relation between the operation of the ignition system and a predetermined reference point or event in the operating cycle of the engine.

This invention is an improvement on the apparatus shown in my copending joint application with John R. MacGregor Serial No. 141,735, filed May 10, 1937, which issued January 7, 1941, as Patent No. 2,228,032.

The apparatus of this invention is used to indicate the relation between a given point in the cycle of an internal combustion engine, such as top dead center of a piston or a pair of pistons, and the time of the spark ignition of a combustible charge in one or more cylinders. The spark causing the ignition ordinarily precedes the top dead center of the piston by several degrees, the numerical value of which is known as the spark advance of the engine. Engine designers have appreciated the importance of varying the spark advance to accommodate changes in the engine speed and load. This is accomplished in modern automobiles by incorporating in their spark advance control mechanism a means for increasing the spark advance as the engine speed increases and a means for decreasing that advance at high engine loads. Since mechanical friction or wear may affect the action exerted by either, or both, of these control mechanisms, it is apparent that the normal operation of such an engine may be at considerable variance from its designed and most efficient characteristics.

In the comparison of different types of fuels to determine the effect of antiknock agents and the like, a knowledge of the behavior of the spark advance control mechanism is of the utmost importance. Previous to our inventions, it was usually necessary to remove the entire ignition system from a test automobile and to install special equipment in order to ascertain the spark advance-speed-engine load characteristics, and the measurement of these characteristics was so uncertain that accurate comparisons of fuels were very difficult to obtain.

In the copending joint application identified above, the means provided to measure spark advance comprised generally a direct current meter, a source of current for the meter, a first current control means such as a grid-controlled discharge tube responsive to an ignition system potential for connecting the meter to the current source, and a second current control means which could be a vacuum type discharge tube responsive to the momentary electric potential induced in an electromagnetic pick-up coil spaced from a moving part of the engine, for example, a magnetic armature carried by the flywheel, the induced potential set up in the coil by the passage of the armature acting upon the second tube to disconnect the meter from its current source. The average current measured by the meter thus gave an indication of the ratio of the time during which the current flowed to the time when the current did not flow. Since the starting and stopping of the current were controlled by an ignition system potential and by a predetermined point on the moving crankshaft or flywheel of the engine, changes in the relationship of these two events would be indicated by the meter reading.

One of the disadvantages of the apparatus just described was its susceptibility to stray potentials in the ignition system, it being well known that secondary voltages are induced back into the primary side of such a system, these stray potentials sometimes actuating the current control means to give faulty or misleading indications. My improved arrangement, which is the subject of this application, includes a second current control means, ordinarily including a pick-up unit which is angularly spaced from the first unit and is utilized to place that current control means which is responsive to ignition potential in an inoperative condition except during a predetermined part of the cycle of operation, this interval being chosen to be short enough so that there is no possibility of the occurrence of stray ignition system potentials.

It is an object of this invention to provide an improved spark advance indicator mechanism which may be controlled to give an indication of the behavior of a single cylinder or a selected group of cylinders in a multicylinder engine without interference from the ignition system potentials acting upon other cylinders in the engine.

Another object is to provide an apparatus for accurately determining the interval ratio between cyclically repeated sets of impulses, regardless of the nature of the impulses, so long as they may be utilized to start and stop the flow of an electric current.

Another object is to provide an apparatus for accurately determining the spark advance of a multicylinder internal combustion engine without requiring extensive mechanical alterations to the engine structure, which apparatus is simple and inexpensive to install and is not readily damaged or affected by vibration and normal usage.

Another and very important object is to provide an improved spark advance indicator that may be installed on automotive vehicles to test the latter under actual operating conditions on the road, as distinguished from shop or laboratory conditions.

Another object is to provide an improved arrangement for interlocking a plurality of grid-controlled electron tubes so that they can only be actuated in a certain sequence to control a current flow.

These and other objects and advantages will be further apparent from the following description and from the accompanying drawing which forms a part of this specification and illustrates the essential features of the invention as applied to a spark advance indicator.

In the drawing: Figure 1 is a diagrammatic end elevation view of this apparatus as applied to a multicylinder engine, together with a schematic connection diagram of a current-controlling and metering means.

Figure 2:
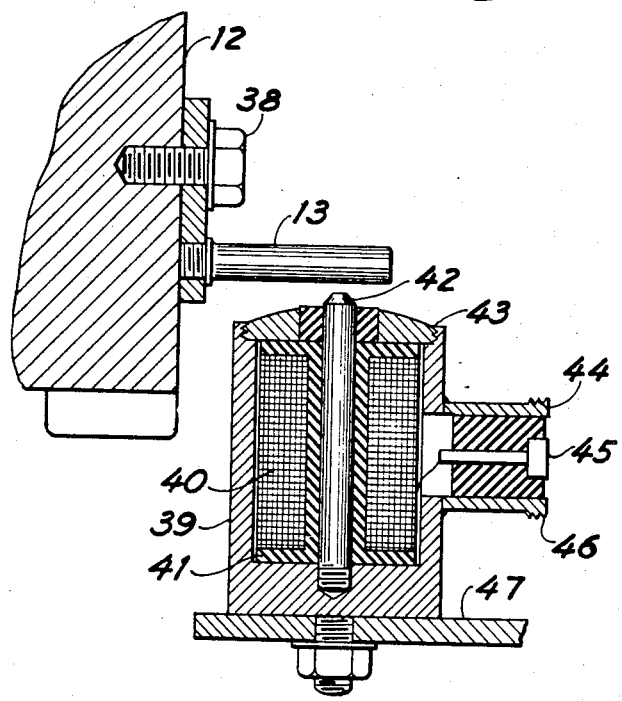

Figure 2 is a section on line II—II of Figure 1 showing a preferred form of electromagnetic pick-up unit and an actuating means therefor.

In the drawing, reference numeral 10 designates a multi-cylinder spark ignition type of internal combustion engine provided with an electric ignition system distributor, generally designated 11, and a flywheel or other exposed rotating part 12 which is in synchronism with the crankshaft of the engine. In this example, an iron or steel armature 13 is secured to flywheel 12 and is adapted successively to pass close to the pole-pieces of a first electromagnetic pick-up unit 14 and a second pick-up unit 15. The voltage impulses caused by the passage of armature 13 close to the pole-pieces of the pick-up units and voltage impulses from the primary or the secondary circuit of the ignition system represented by distributor 11 are utilized to control the average flow of electric current through a meter 16 which may be calibrated directly in degrees of spark advance, as will be described below.

The control apparatus used for this purpose consists of a first gas or vapor-filled grid-controlled discharge tube 17 having a control grid 18, an anode or plate 19, and a cathode or filament 20. Cathode 20 may be energized by any suitable source of electric current not shown. The anode or plate potential for tube 17 is supplied from battery 21 through conductor 22 and series resistors 23 and 24. The control grid 18 of tube 17 is connected by means of conductor 48 to either the primary or the secondary circuit in the ignition system distributor 11 and is adapted to fire tube 17 and cause it to conduct current from battery 21 through meter 16 when a suitable voltage impulse is impressed upon grid 18 from the ignition system if an adequate potential exists on the anode or plate 19. In the meter circuit resistors 23 and 24 limit the meter current to a value which gives the desired deflection on the meter scale.

In order to prevent tube 17 from being fired by any but the desired electric potentials from the distributor 11, and also to terminate the current flow through meter 16 at a predetermined point in the rotation of flywheel 12, a second gas or vapor-filled grid-controlled discharge tube 25 is provided, this tube having a control grid 26, an anode 27 and a cathode 28, as shown in Figure 1. Control grid 26 of tube 25 is connected by means of conductor 29 to the second pick-up unit 15 mentioned above. The function of tube 25 is to extinguish tube 17 and terminate the current flow through meter 16. This is accomplished by connecting the anode 27 of tube 25 to the intermediate point 30 between resistors 23 and 24 by means of conductor 31. Tubes 17 and 25 require substantially equal potentials upon their respective anodes, but tube 25 has upon its anode a higher potential than that which exists upon the anode of tube 17 because of the potential drop through resistor 24. Consequently, when tube 25 is fired by the passage of armature 13 across the pole-piece of pick-up unit 15 the anode potential available for tube 17 falls below that which is necessary to render tube 17 conducting. Thereafter, gas-filled tube 25, because of its well known characteristics, remains conducting even though the momentary electric potential on its control grid 26 is terminated, and prevents tube 17 from being fired by subsequent undesired potentials from the ignition system distributor 11.

A third tube 32 is used to place the first tube 17 in condition to become conducting as soon as another desired potential impulse is received from distributor 11. Tube 32 is of the vacuum type and is provided with a control grid 33, an anode 34 and a cathode 35. Grid 33 of tube 32 is connected by means of conductor 36 to the first pick-up unit 14. The anode 34 of tube 32 is connected by means of conductor 37 to the anode circuits of tubes 17 and 25 at intermediate point 30 so that anode 34 is in parallel with anode 27 of tube 25. As soon as flywheel 12 has completed the desired portion of its rotation and is approaching the point after which a desired or predetermined potential impulse from distributor 11 is to be impressed upon control grid 18 of the first tube 17, armature 13 passes pick-up unit 14 and induces therein a potential impulse which is impressed upon control grid 33 of vacuum tube 32. This causes tube 32 momentarily to become conducting, thereby reducing the anode potential of tube 25 and extinguishing the latter. This operation places tube 17 in condition to be controlled by its own grid 18 by restoring its anode potential and a subsequent potential impulse from the distributor 11 again starts a current flow through meter 16. Shortly thereafter armature 13 induces a potential in pick-up coil 15, firing tube 25 which extinguishes tube 17 in the manner previously described and keeps that tube extinguished until tube 32 is again fired by the first pick-up unit 14. This cycle of operation is repeated and is effective to control the average current flowing through meter 16 so that it will truly represent the ratio of the interval between the desired or predetermined ignition system potential impulse and the passage of armature 13 across pick-up unit 15, the position of the latter being easily related to any desired point in the cycle of the operation of the engine, such as the top center position of one or more of the pistons in engine 10, to the interval represented by the remaining portion of the rotation of flywheel 12.

Figure 2 illustrates a preferred form of construction for the electromagnetic pick-up units 14 and 15. Armature 13, which is desirably of paramagnetic material such as steel or soft iron, is secured to the face of flywheel 12 by means of a machine screw 38 so as to extend outwardly at right angles to the plate of rotation of flywheel 12. The pick-up unit proper consists of a cylindrical body 39 of steel or other paramagnetic material recessed to receive a winding 40 supported by an insulating spool 41. The pole-piece 42 of the pick-up unit is desirably a small diameter axial rod of permanently magnetized material, such as cobalt alloy steel. A suitable cover 43 is screwed into body 39 to retain the spool and winding in position therein. At one side of body 39 is shown an outlet connection which may be a short metal tube 44 fitted with an insulated central contact 45 and provided with threads 46 to which a screw-type connector may be secured. Pick-up units 14 and 15 are desirably supported by means of a frame 47 adjustably positioned with respect to flywheel 12 so that the armature 13 is in proper relationship to the outer end of pole-pieces 42. Usually pick-up unit 14 is set on frame 47 to be actuated by armature 13 at a point about 60° before the top center position of the piston in the cylinder in which will occur the spark used to start the current flow through meter 16. The exact position is not at all important. The location of the second pick-up unit 15 is necessarily chosen so that armature 13 passes the pole-piece 42 of that unit after the occurrence of the spark which has caused tube 17 to become conducting and start a current flow through meter 16.

In addition to its application to the spark advance indicator described and claimed in my co-pending joint application Serial No. 141,735 with John R. MacGregor, now Patent No. 2,228,032, it is obvious that the interlocking arrangement of tubes 17, 25 and 32 could be used wherever cyclically repeated impulses are to be selectively utilized to control a current flow. It is believed that this invention comprehends broadly a device for measuring the ratio of intervals between two predetermined impulses in a series of repetitive or cyclically repeated impulses, the time of occurrence of the two predetermined impulses being variable by some outside factor. A preferred means for doing this may comprise a first means responsive to the first of said predetermined impulses, said means being effective to initiate a flow of electric current through a current averaging meter, a second means responsive to the second of said predetermined impulses adapted to terminate the current flow through said meter and also to render said first-named means unresponsive to succeeding impulses, and a third means actuated by a third predetermined impulse taking place just before a second occurrence of said first predetermined impulse for rendering the first-named current control means responsive to one succeeding impulse. In this example, grid-controlled electron or discharge tubes are used for the three means just named, the anodes of the first and second of these tubes being supplied from a common source of ionizing potential, and the anode of the third tube being supplied by a lower potential from said same source.

Although a specific embodiment of this invention has been described and illustrated, it is understood that many changes and modifications could be made and all those that are within the scope of the following claims are embraced thereby.

I claim:

1. A spark advance indicator circuit for a multicylinder spark ignition internal combustion engine comprising an electric current meter, a source of electric current for said meter, a first electric current control means adapted to be connected to the ignition system of said engine to receive a succession of electrical impulses therefrom any one of which is adapted to actuate said control means to connect said current meter to said current source, a second electric current control means connected to said first control means and responsive to a predetermined first position of a cyclically moving part of said engine to actuate said first current control means to disconnect said meter from said current source and to render said first current control means unresponsive to subsequent ignition system potentials, and a third current control means connected to said first current control means and responsive to a second position of said cyclically moving part of said engine to render said first current control means responsive to a succeeding ignition system electrical impulse.

2. A spark advance indicator according to claim 1, in which said electric current control means comprises grid-controlled discharge tubes.

3. A spark advance indicator according to claim 1, in which said electric current control means comprises grid-controlled discharge tubes, said second and third named current control means each comprise an electromagnetic pick-up unit, and said cyclically moving part of said engine comprises an armature of paramagnetic material adapted to induce a potential in each of said pick-up units to actuate their respective current control means.

4. A spark advance indicator according to claim 1, in which said second and third electric current control means each comprise an electromagnetic pick-up unit, and said cyclically moving part of said engine comprises an armature of paramagnetic material secured to the flywheel of said engine and adapted to induce a potential in each of said pick-up units.

5. A spark advance indicator for a multicylinder spark ignition internal combustion engine comprising a first means responsive to a cyclically moving part of said engine to produce an electric current impulse at a predetermined point in the travel of said moving part, a second means responsive to said cyclically moving part of said engine to produce an electric current impulse at a predetermined point in the travel of said movable part spaced from said first predetermined point, a direct current averaging meter, a source of direct current for said meter, and means adapted periodically to connect said meter to said current source and to disconnect it therefrom during a predetermined cycle of operation of said engine, said means comprising three electric current controllers, one adapted to be connected to the ignition system of said engine to be actuated by any one of a succession of spark producing potentials therein, the second adapted to be connected to said first named electric current impulse producing means to be actuated by a current impulse therefrom and connected to said first electric current controller to render it inoperative, and the third controller adapted to be connected to said second named electric current impulse producing means to be actuated by a current impulse therefrom and connected to said first electric current controller to render it responsive to a succeeding spark producing potential from said ignition system.

6. A spark advance indicator for a multicylinder spark ignition internal combustion engine comprising a first magnetic pick-up coil adapted to be spaced from a cyclically moving part of said engine and to have induced therein an electric potential by the motion of said moving part, a second magnetic pick-up coil spaced from said first coil and similarly responsive to the induction of electric potentials by the motion of said moving part, an electric current averaging meter, a source of electric current therefor and means adapted periodically to connect said meter to said current source and to disconnect it therefrom during a predetermined cycle of operation of said engine, said means comprising three electric current controllers, one adapted to be connected to the ignition system of said engine to be actuated by any one of a succession of spark producing impulses therefrom, the second connected to said first magnetic pick-up coil and to said first controller to cause the latter to be unresponsive to spark producing potentials after a potential has been induced in said first pick-up coil, and the third controller connected to said second magnetic pick-up coil and to said first electric controller so constructed and arranged that an induced potential in said second pick-up coil will actuate said third controller to place said first controller in condition to be responsive to a suceeding spark producing potential from said ignition system.

KENNETH R. ELDREDGE.